Aug. 7, 1934.  S. HEINTZ  1,969,706
METHOD AND APPARATUS FOR MAKING COMPOSITE SHEET ARTICLES
Filed Aug. 19, 1932
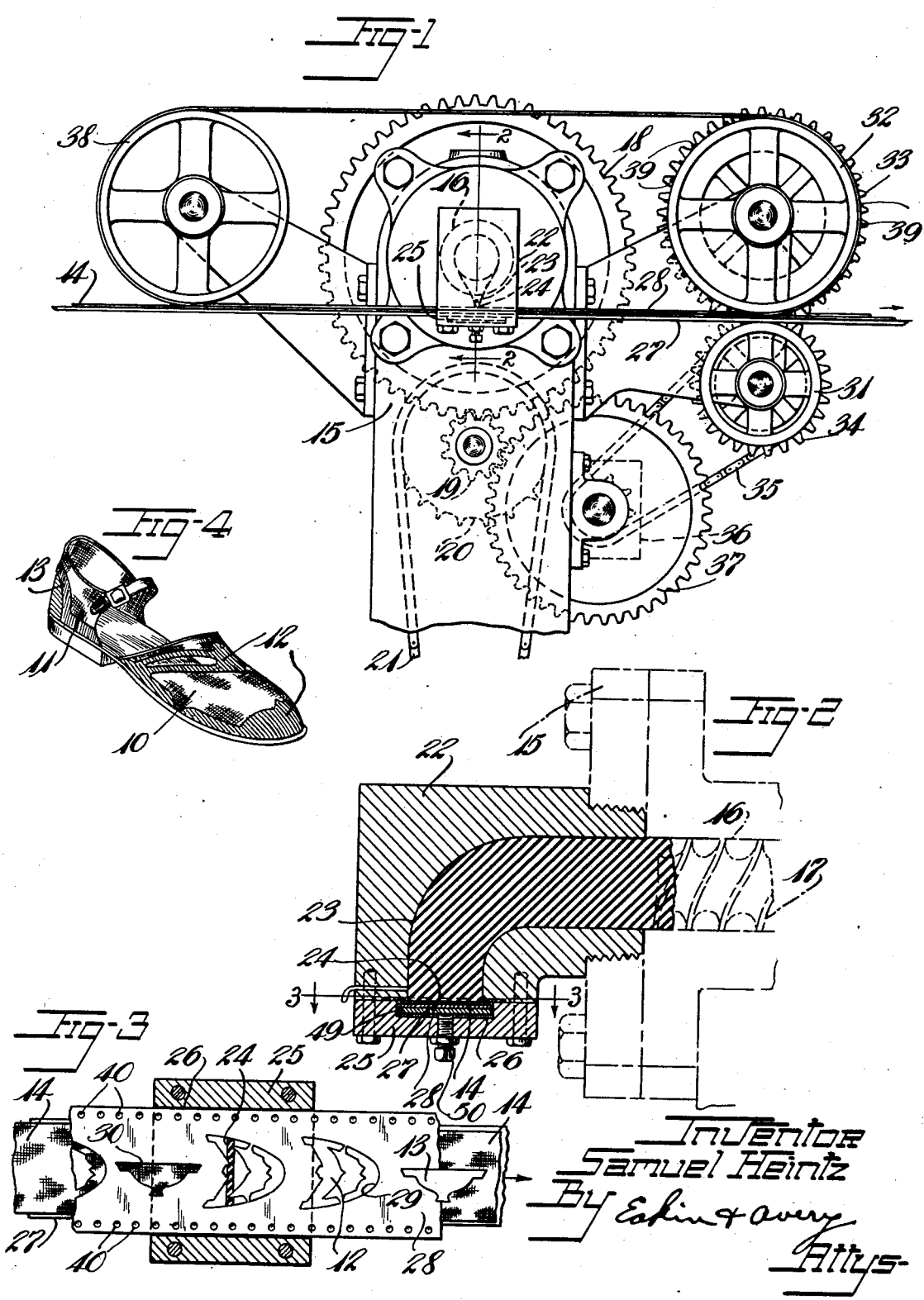

Patented Aug. 7, 1934

1,969,706

UNITED STATES PATENT OFFICE 1,969,706

METHOD AND APPARATUS FOR MAKING COMPOSITE SHEET ARTICLES

Samuel Heintz, Watertown, Mass., assignor, by mesne assignments, to Hood Rubber Company, Inc., Wilmington, Del., a corporation of Delaware Application August 19, 1932, Serial No. 629,498

2 Claims. (Cl. 101—122)

This invention relates to the manufacture of composite sheet articles, such for example as footwear upper blanks of fabric or other sheet material having deposits of rubber or other plastic material adhered to the sheet material over determinately limited areas thereof for such purposes as reinforcement and ornamentation.

The chief objects of this invention are to provide for convenience and rapidity in the production of such articles and to provide attractive and durable articles.

These and further objects will be apparent from the following description, reference being had to the accompanying drawing in which:

Fig. 1 is an elevation, with parts broken away, of apparatus constructed according to and embodying the invention in its preferred form.

Fig. 2 is a section on the line 2—2 of Fig. 1.

Fig. 3 is a section on the line 3—3 of Fig. 2.

Fig. 4 is a perspective view of an article of footwear constructed according to the invention.

Referring to the drawing, Fig. 4 shows an article of footwear of the sandal type comprising a sole, an upper fore part 10 and an upper heel part 11 of fabric or other sheet material having deposits 12 and 13, preferably of rubber composition, adhered to these parts over determinately limited areas thereof for reinforcement and ornamentation.

For convenience and rapidity of manufacture the parts 10 and 11, according to the preferred procedure, are cut from a sheet 14 onto which the plastic material has previously been deposited and adhered, the depositing and adhering operations preferably being carried out by means of the apparatus shown in the drawing.

A forcing machine 15 of known construction for plastic material comprises a forcing chamber 16 and a forcing screw 17 which is rotated by means of cooperating gears 18 and 19 driven from a source of power (not shown) by a sprocket wheel 20 and driving chain 21. The machine is provided with an extruding head 22 having a discharge passage 23 which is downwardly directed as shown in Fig. 2, and is provided at its lower end with a horizontal, elongated nozzle opening 24 and a guide structure 25 underlying the nozzle and secured to the head 22.

The guide 25 is formed with a horizontal through-slot 26 adapted to guide an assembly passing through the slot consisting of a conveyor belt 27, of metal or other stiffly flexible material, upon which are positioned in superimposed relation the sheet fabric 14 and an endless stencil strip 28, the latter being formed with stencil openings 29 and 30 of a shape corresponding to the configurations of the deposits desired to be formed.

Preferably a supporting plate 49, vertically adjustable as by means of a screw 50, is mounted in the guide slot 26 to support the conveyor belt 27, fabric 14 and stencil 28 for sliding movement thereover in the proper relation to the nozzle opening so that the plastic material will be deposited upon the fabric underlying the stencil openings in adhesion with the fabric and will be sheared off substantially flush with the upper surface of the stencil strip as the latter, the fabric and the belt are drawn past the nozzle.

For drawing the belt 27, fabric 14 and the stencil strip 28 together at the same speed past the extrusion nozzle a pair of rolls 31 and 32 are provided, these rolls being rotated together by interconnecting gears 33 and 34 and being driven in timed relation with the forcing screw 17 by means of a driving chain 35, a variable speed device 36, and a gear 37, all driven in train from gear 19 of the forcing screw drive.

The endless stencil strip 28 passes around roll 32 and around an idler roll 38 mounted at the opposite side of the extruding machine, and for preventing slippage of the stencil strip, a plurality of teeth 39, 39 are peripherally disposed on the roll 32 for engagement in marginal rows of apertures 40, 40 in the stencil strip. If desired, the belt 27 and driving roll 31 may be similarly provided with cooperating apertures and teeth (not shown), although this is not essential to prevent slippage in all cases.

The margins of the stencil apertures are preferably beveled somewhat so as to diverge toward the fabric when the stencil is in association therewith to facilitate the stripping of the stencil from the plastic deposits.

In operation, the conveyor belt 27, the fabric 14 and the stencil strip 28 are drawn through the guide slot 26 and past the extruding nozzle 24 by means of the rolls 31 and 32 in the manner above described, the plastic material being progressively forced into adhesion with the fabric over the areas of the stencil apertures, and being sheared off at the upper surface of the stencil strip in a thickness of each deposit corresponding to the thickness of the stencil strip. The stencil strip is drawn upwardly away from the fabric at the roll 32 with a progressive stripping action, in which the stencil, but not the fabric and plastic material, is flexed, thereby avoiding undesirable distortion of the plastic material. The deposits 12, 13 are left adhered to the fabric, and the latter with the deposits is conveyed away upon the belt 27 for subsequent cutting to shape and incorporation in the complete article such as the shoe of Fig. 4.

The procedure is continuous and rapid, and at the extrusion nozzle the plastic material is firmly pressed against the fabric and formed to shape. The effectiveness of this operation is not adversely affected by the presence of the solid portions of the stencil strip as is the case of the calendering procedures proposed heretofore where the rolls are sometimes prevented from satisfactorily pressing the plastic material into the stencil openings by the layer of rubber that is present between the roll and the solid portion of the stencil.

I claim:

1. The method which comprises depositing rubber composition through a stencil onto a backing over a determinately limited area of the latter in adhesion therewith throughout, said area, shearing the rubber composition substantially flush with the face of the stencil remote from the backing, and separating the backing and stencil, leaving the rubber composition on the backing.

2. The method of making a composite article which comprises progressively extruding rubber composition through a stencil into adhesive engagement with a fabric backing over a determinately limited area of the latter, progressively shearing the rubber at the face of the stencil remote from the fabric and progressively separating the fabric from the stencil, leaving the rubber composition adhered to the fabric.

SAMUEL HEINTZ.